United States Patent
Nagai et al.

(10) Patent No.: US 7,756,127 B2
(45) Date of Patent: Jul. 13, 2010

(54) MOBILE TERMINAL

(75) Inventors: Takeshi Nagai, Saitama (JP); Tatsuya Zettsu, Tokyo (JP); Satoshi Akimoto, Tokyo (JP); Tatsunori Saito, Kanagawa (JP); Yasushi Unoki, Tokyo (JP)

(73) Assignee: Kabushiki Kaisha TOSHIBA, Tokyo (JP)

( * ) Notice: Subject to any disclaimer, the term of this patent is extended or adjusted under 35 U.S.C. 154(b) by 1060 days.

(21) Appl. No.: 11/262,534

(22) Filed: Oct. 28, 2005

(65) Prior Publication Data

US 2006/0256785 A1 Nov. 16, 2006

(30) Foreign Application Priority Data

May 10, 2005 (JP) ............................. 2005-137390

(51) Int. Cl.
*H04L 12/28* (2006.01)
(52) U.S. Cl. ...................... 370/389; 709/235
(58) Field of Classification Search .............. 709/235; 711/103, 104; 370/389
See application file for complete search history.

(56) References Cited

U.S. PATENT DOCUMENTS 6,438,643 B1 * 8/2002 Ohara et al. ............. 711/103
7,401,324 B1 * 7/2008 Dmitriev ................. 717/130
2004/0199659 A1 * 10/2004 Ishikawa et al. ........... 709/235
2006/0159054 A1 * 7/2006 Kobayashi et al. ......... 370/338

FOREIGN PATENT DOCUMENTS

| JP | 10-126772 A | 5/1998 |
| JP | 11-098503 A | 4/1999 |
| JP | 2001-274681 A | 10/2001 |

\* cited by examiner

*Primary Examiner*—Dang T Ton
*Assistant Examiner*—Wei Zhao
(74) *Attorney, Agent, or Firm*—Frishauf, Holtz, Goodman & Chick, P.C.

(57) ABSTRACT

An efficient retransmission control method, whereby a wasteful retransmission request and retransmission of a packet are not carried out when packet loss occurs. A receiving unit sends the received retransmission request information to a retransmission determining unit. When receiving the retransmission request information, the retransmission determining unit reads out refresh data time information, packet type information of the packet for which a retransmission request is issued, and the time information thereof from a packet information monitoring unit. The retransmission determining unit makes a determination as to whether or not to issue a retransmission request using the read-out refresh data time information, packet type information of the packet for which a retransmission request is issued, and the time information thereof.

13 Claims, 14 Drawing Sheets

MOBILE TERMINAL

CROSS-REFERENCE TO RELATED APPLICATIONS

This application is based upon and claims the benefit of priority from the prior Japanese Patent Application No. 2005-137390, filed on May 10, 2005, the entire contents of which are incorporated herein by reference.

BACKGROUND OF THE INVENTIONS

1. Field of the Invention

The present invention relates to a transmitter and a receiver, and more particularly to a transmitter and a receiver capable of controlling a packet retransmission request and a packet retransmission decision in accordance with the type of data to be sent, as well as the data string to be sent, in a packet retransmission request for a packet loss detected in a receiver, and in a transmitter retransmission decision for the retransmission request.

2. Description of the Related Art

In recent years, the transmission of image data, voice data and other such data has been energetically carried out via various communications media, such as Internet communications. In Internet-based data transmissions in particular, in addition to the download-type transmission systems, which have been utilized for some time, there has been an increase in services based on stream-type transmission systems.

A stream-type transmission system is one in which the reproduction of image and voice data received by a receiving side terminal is executed in parallel with the carrying out of image and voice data transmission from a transmitting side to a receiving side terminal, and is being used in Internet telephony and remote teleconferencing. As the transmission protocol best suited to this kind of stream-type transmission system, UDP/IP (User Datagram Protocol/Internet Protocol) and the like are typically being used. When data is transmitted in packets using this UDP/IP transmission protocol, since the transmitting side specifies the destination IP address and transmits unilaterally, if packet loss should occur along the transmission channel, the transmitting side has no way of knowing whether or not the packets arrived at the destination, and the receiving side has no way of knowing if all of the intended packets from the transmitting side arrived, which means that lost packets are not automatically retransmitted.

Further, as the UDP/IP host protocol there is the IETF RFC1889-specified protocol called RTP (Real-time Transport Protocol). If data transmission is carried out in accordance with the RTP/UDP/IP protocols, since reproduction-related time information and packet number information is attached to each packet, the temporal relationship of the data being sent can be discerned on the receiving side by referencing this time information and packet numbers, making it possible to carry out synchronized reproduction.

In a data transmission in accordance with the RTP/UDP/IP protocols, when packet loss is detected at the receiving side, a retransmission request is sent to the transmitting side, and the lost packet is sent once again. However, if the receiving side performs a retransmission request for all lost packets, and the transmitting side performs a retransmission for all retransmission requests, efficiency drops, and the available transmission band comes under pressure. Thus, efficient retransmission control is desirable.

To solve for the above problem, a method has been proposed, whereby the packet type (I-picture, P-picture, B-picture, and so forth) is determined, and a retransmission request is only sent when the packet type is determined to be an I-picture, as disclosed in Japanese Laid-open Patent No. 11-98503. Further, as indicated in Japanese Laid-open Patent No. 2001-274681, a method has been proposed, whereby, when the transmitting side receives a retransmission request, the transmission number of each I-picture is set at 1, the precedence of the $n^{th}$ picture from this I-picture is set at 1/n, and retransmission is not carried out for a picture having a precedence of a certain threshold value or less. Now then, when packet loss occurs and a retransmission request is issued during the transmission of image data, in the method whereby a retransmission request is only made when the packet type is determined to be an I-picture, image degradation due to packet loss can be held down to a certain extent, while reducing retransmission requests as much as possible by virtue of the fact that a retransmission request is issued only for the I-picture, which is the most important packet type.

However, when packet loss occurs for P-picture as well, conventional control is not always sufficient since an error is propagated in the subsequent frame. In other words, if there is no I-picture for a long time after a P-picture that experienced packet loss, an accurate display cannot be made until the next I-picture appears, thus prolonging the effects of this error. Further, this same problem occurs even with a method whereby the precedence is set in advance by a function, and retransmission is only carried out when this precedence is not less than a threshold value.

SUMMARY OF THE INVENTION

An object of the present invention is to provide a transmitter and a receiver, which solve for the above problems, and which are capable of controlling a packet retransmission request and a packet retransmission decision in accordance with the type of data to be sent, as well as the data string to be sent, in a packet retransmission request for a packet loss detected in a receiver, and in a transmitter retransmission decision for a retransmission request.

An aspect of the present invention provides a transmitter including a transmitting unit configured to transmit a packet to be packetized image data; a receiving unit configured to receive a retransmission request of the packet transmitted by the transmitting unit; a packet managing unit configured to manage information of a reproduction time of the packet transmitted by the transmitting unit; and a packet retransmission controller configured to, if the retransmission request is received by the receiving unit, read out from the packet managing unit a first reproduction time during which image data of the packet requested for retransmission is reproduced, and a second reproduction time, which is a later reproduction time than the first reproduction time and during which a frame containing intra prediction data nearest to the first reproduction time is reproduced, and configured to, if a difference between the first reproduction time and the second reproduction time is not less than a predetermined threshold value, send to the transmitting unit a command for retransmitting the packet requested for retransmission.

A further aspect of the present invention provides a receiver including a receiving unit configured to receive a packet to be coded and to be packetized image data; an information storage unit configured to store information of the packet received by the receiving unit; a packet loss determining unit configured to determine a packet loss based on whether or not packets are received in the order in which they are to be received by the receiving unit; a packet time-information predicting unit configured to predict a second reproduction time to be based on at least two reproduction times of frames containing intra prediction data, wherein the second reproduction time is a later reproduction time than a first reproduction time, and during which is reproduced a frame containing intra prediction data nearest to the first reproduction time, wherein at least two reproduction times of frames are earlier reproduction times than the first reproduction time during which is reproduced image data, which is reproduced subsequent to a lost packet determined to be packet loss by the packet loss determining unit; and a retransmission determining unit configured to make a determination that a retransmission request of the lost packet is to be issued if packet loss is determined by the packet loss determining unit, and a difference between the second reproduction time predicted by the packet time-information predicting unit and the first reproduction time is not less than a predetermined threshold value.

According to the above-mentioned aspects of the present invention, it is possible to control a packet retransmission request and a packet retransmission decision in accordance with the type of data to be sent, as well as the data string to be sent, in a packet retransmission request for a packet loss detected in a receiver, and in a transmitter retransmission decision for a retransmission request.

DETAILED DESCRIPTION OF THE INVENTION

Embodiments of the present invention will be explained below.

First Embodiment

Figure 1:
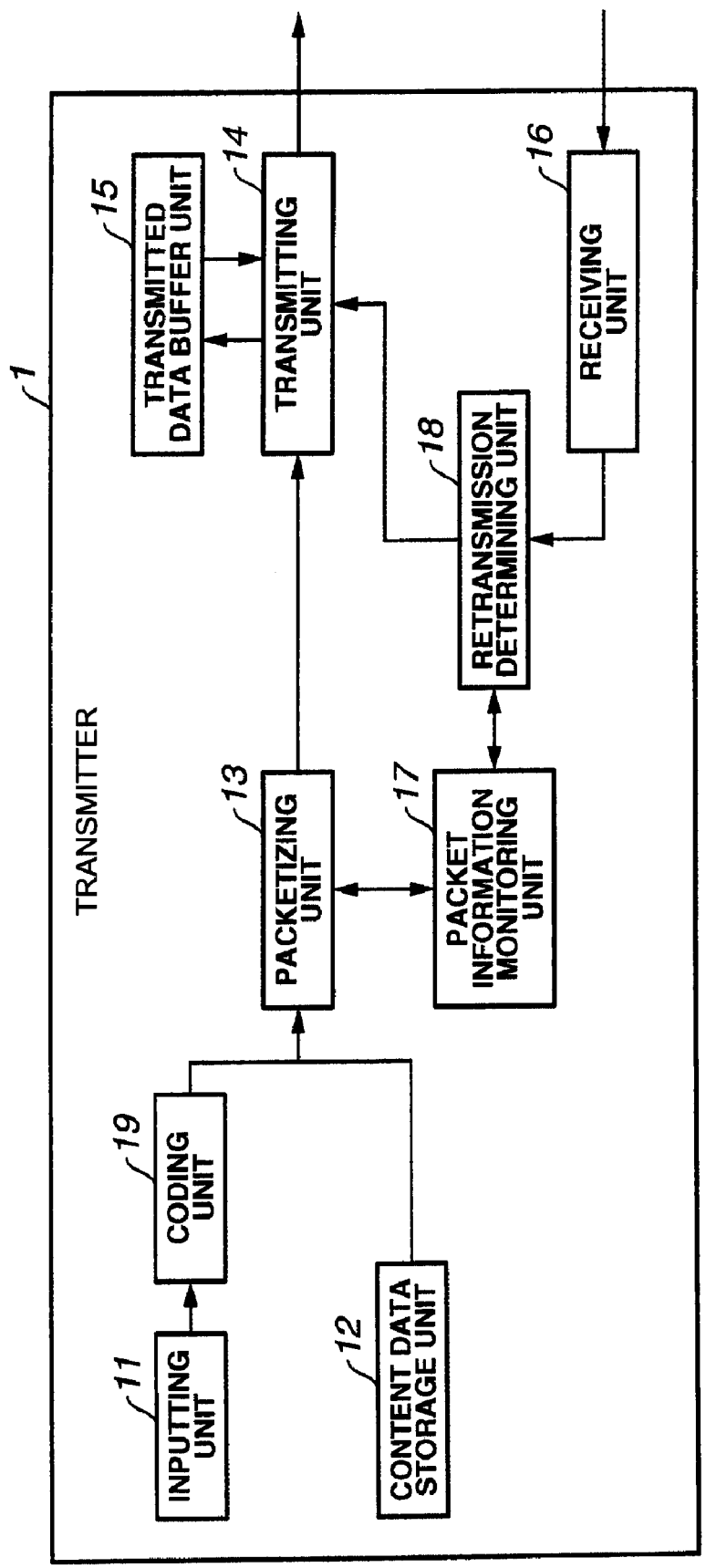
FIG. 1 is a block diagram of when the present invention is applied to a transmitter.

An embodiment, which applies the present invention to a transmitter, will be explained using the figures. FIG. 1 is a block diagram showing the structure of a transmitter of the present invention. A transmitter 1 of the present invention has an inputting unit 11; a content data storage unit 12; a packetizing unit 13; a transmitting unit 14; a transmitted data buffer unit 15; a receiving unit 16; a packet information monitoring unit 17; a retransmission determining unit 18; and a coding unit 19. The respective units have the following functions.

The inputting unit 11 has a function for inputting an image using a camera or the like, and an image inputted by the inputting unit 11 is coded by the coding unit 19, then the coded data is assigned a header based on the UDP/IP system, and sent to the packetizing unit 13.

Content data inputted from outside, and data created inside the transmitter are stored in the content data storage unit 12, and the receipt of a command to transmit part or all of the data stored in the content data storage unit 12 serves as a trigger by which data to be transmitted is sent to the packetizing unit 13.

The packetizing unit 13 has a function for packetizing coded data using the RTP system. Then, data packetized in the packetizing unit 13 is sent to the transmitting unit 14.

The transmitting unit 14 has a function for transmitting to the outside data, which has been packetized in the packetizing unit 13. Then, a packet for which transmission has been completed is stored in the transmitted data buffer unit 15. In addition, triggered by a request from the retransmission determining unit 18, the transmitting unit 14 also has a function for reading a pertinent packet from the transmitted data buffer unit 15 and transmitting it to the outside. Further, the data of this packet is once again stored in the transmitted data buffer unit 15 once it has been retransmitted.

The transmitted data buffer unit 15 has a function for temporarily storing the data of a packet, which has been sent to the outside by the transmitting unit 14 as described above. The transmitted data buffer unit 15 is constituted in accordance with a ring buffer, and when the buffer capacity becomes full, data is deleted beginning with the data of the oldest packet. Furthermore, the present invention is not limited to a ring buffer, and other buffers can also be used.

The receiving unit 16 has a function for receiving data mainly transmitted from the outside, and when it receives retransmission request information due to packet loss, it sends this received retransmission request information to the retransmission determining unit 18.

The packet information monitoring unit 17 has a function for monitoring information related to data, which has been packetized in the packetizing unit 13. The data monitored by the packet information monitoring unit 17 will be explained further below. Furthermore, the present invention can also be configured so as to monitor data other than the monitored data described below.

Figure 3:
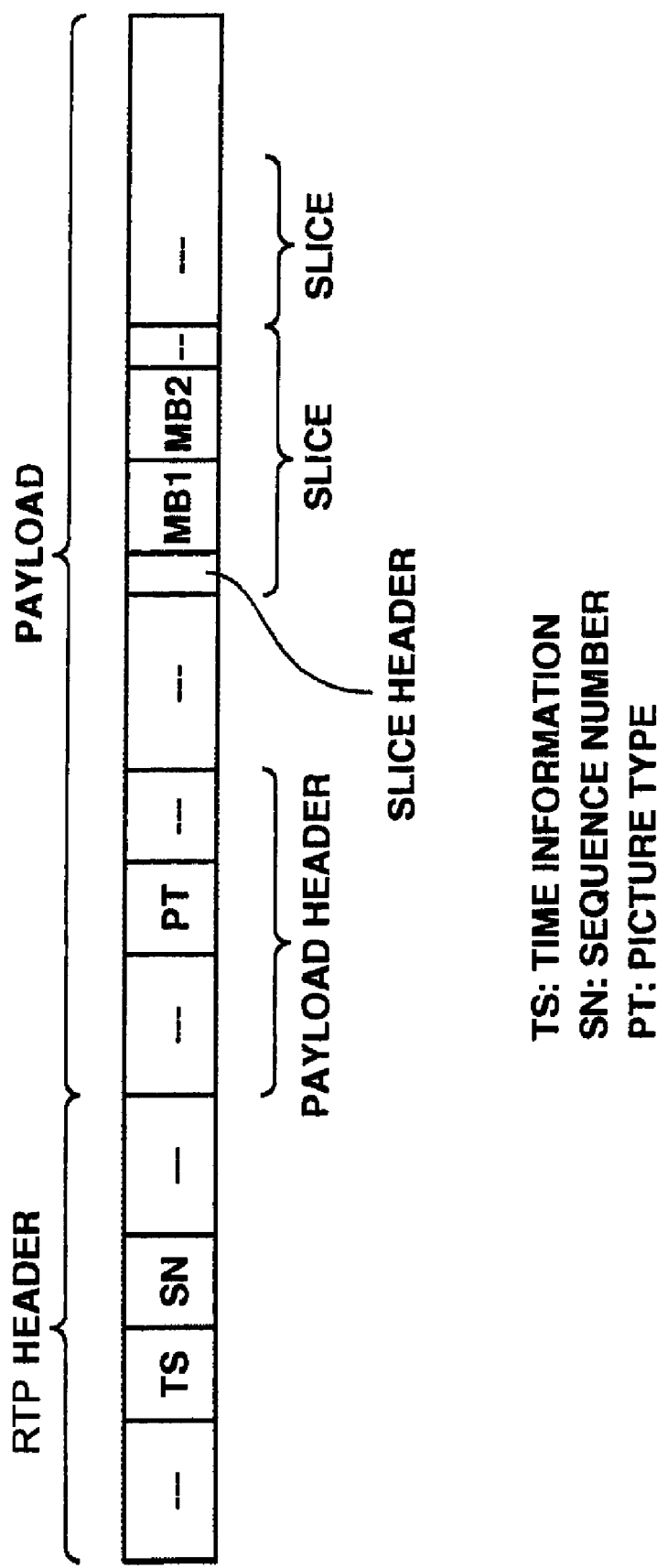
FIG. 3 is a simplified diagram showing the constitution of an RTP packet in the first embodiment of the present invention.

FIG. 3 is a simplified diagram showing an overview of a packet when certain information is packetized using the RTP system. As shown in FIG. 3, a packet, which has been packetized using the RTP system, includes time (time stamp) information ("TS" in FIG. 3) and sequence number information ("SN" in FIG. 3) in the RTP header, and includes the picture type (I, P, B, and so forth) ("PT" in FIG. 3) and the like in the payload header part. The packet information monitoring unit 17 monitors each packet for at the least time (time stamp) information, sequence number information and picture type information.

Figure 4:
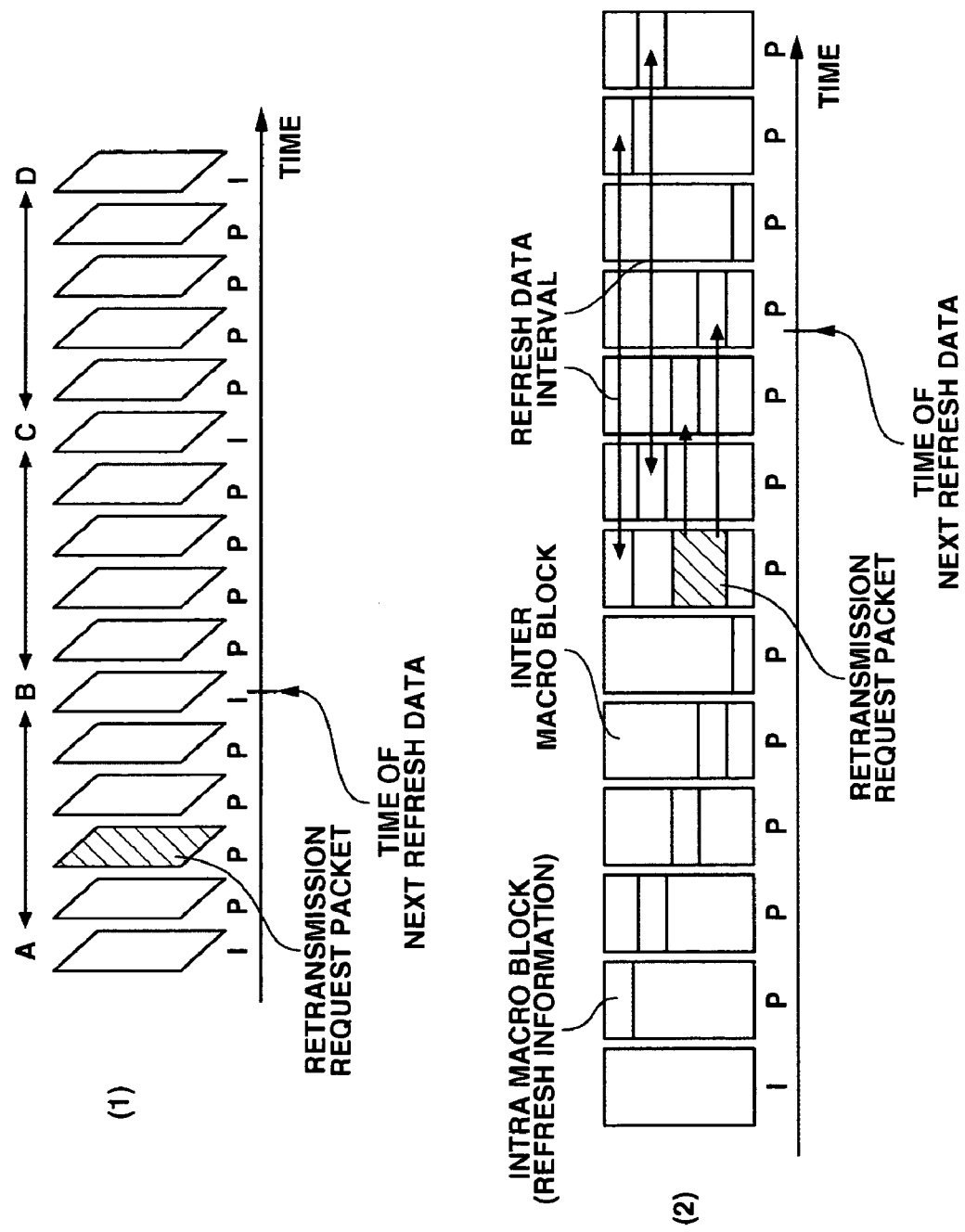
FIG. 4 is a diagram showing a refresh method in the first embodiment of the present invention.

The picture type includes the types I, P, B and so forth, and large numbers of P- and B-pictures are used because the amount of code is less than that of an I-picture. An I-picture-based refresh is carried out in order to enhance error resistance. Two typical image information refresh methods are used here. One is a method, whereby an entire image is refreshed in the I-frame as shown in (1) of FIG. 4, and the other one is a method, whereby a single image is refreshed one part at a time as shown in (2) of FIG. 4. When a refresh method such as that of (1) of FIG. 4 is employed, in the case of an I-picture, I-information is entered in the payload picture type location. And referencing the payload picture type location reveals that this packet is data for refresh. However, when a refresh method such as that of (2) of FIG. 4 is employed, since P information is entered in the payload picture type location even though one part is data for refresh (one part is intra prediction data), there is no way of telling from this information alone if it is data for refresh. Thus, in order to determine if the data is for refresh, a location (slice header or the like), in which a macro block prediction system (intra prediction or inter prediction) is entered, will also be referenced. When a data configuration, which employs the refresh method of (2) of FIG. 4, is used, the packet information monitoring unit 17 will also monitor the locations (slice header and so forth), where the respective macro block prediction systems (intra prediction or inter prediction) are entered in addition to the above-mentioned three pieces of information. Hereinafter, a packet comprising data for refresh will be described as a refresh data packet.

Now then, the retransmission determining unit 18 has a function for making a determination as to whether or not retransmission will be carried out based on retransmission request information sent from the receiving unit 16 and one part of the packet information monitored in the packet information monitoring unit 17. Furthermore, the packet information read method for reading from the packet information monitoring unit 17, and the retransmission determination method using the retransmission determining unit 18 will be explained in detail further below.

Figure 2:
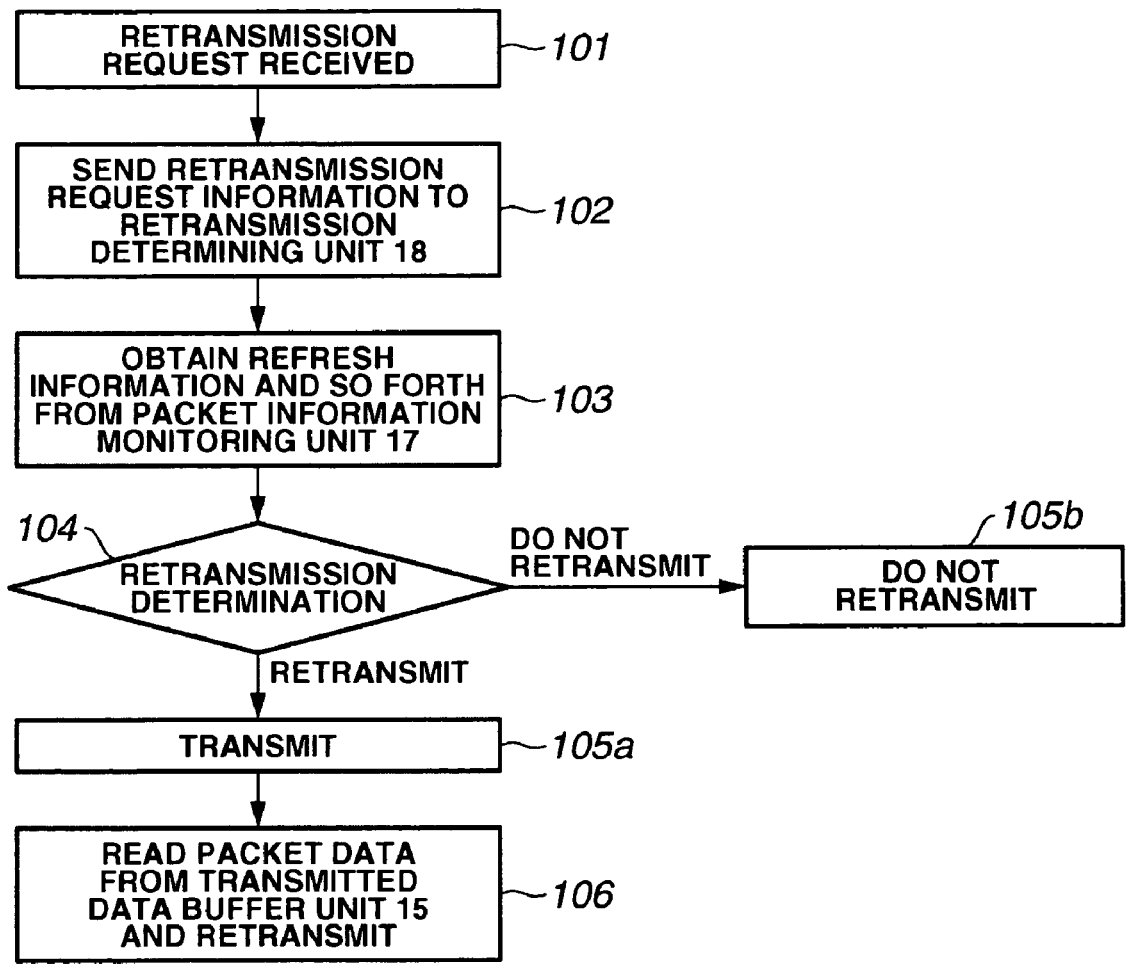
FIG. 2 is a flowchart showing a retransmission control method in a first embodiment of the present invention.

Next, a retransmission control method of when a retransmission request is received by the receiving unit 16 in a transmitter 1 of the present invention will be explained using a flowchart. FIG. 2 is a flowchart showing a retransmission control method in accordance with a transmitter 1. Firstly, packet data, which is transmitted by the transmitting unit 14, generates packet loss for some reason, and a retransmission request is sent from the receiving side, and when the retransmission request is received in the receiving unit 16 (Step 101), the receiving unit 16 sends the retransmission request information, which is sent, to the retransmission determining unit 18 (Step 102). Furthermore, in general, the retransmission request information in Step 102 utilizes sequence number information, which is recorded in the RTP header of the packet transmitted by the transmitting unit 14. Further, as the retransmission request method, a method, which directly specifies the sequence number of the packet to be retransmitted (NACK system), and a method, which indirectly specifies the packet, which could not be received, by communicating only the number of the received packet (ACK system), can be cited. Any kind of retransmission request method can be used in the present invention, and, for example, a system, which uses the time stamp information included in the RTP packet, communicates the packet time information from the receiving side to the transmitting side, and requests the retransmission of a packet corresponding to this time, or a system, which communicates the time of a packet that the receiving side is currently in the process of decoding or displaying, or the network transmission delay information, and determines the packet to be retransmitted to the transmitting side, can also be considered. Thus, retransmission request information is not limited to the above-mentioned sequence number alone, but rather can be any information so long as it is information, which reveals which packet a retransmission is being requested for, or the time, at which this packet is used (at which the image of this packet is displayed).

Next, when the retransmission determining unit 18 receives retransmission request information, it reads out, from the packet information monitoring unit 17, the time information of the refresh data packet subsequent to the packet for which there is a retransmission request, the packet type information of the packet for which there is a retransmission request, and the time information thereof (Step 103). Furthermore, the packet type information of the packet for which there is a retransmission request, and its time information does not need to be read out if it comprises the retransmission request information sent by the retransmission determining unit 18. Further, if the refresh method is like that of (1) of FIG. 4, the time information of the subsequent refresh data packet has a later time information than the time information of the packet for which there is a retransmission request, and refers to the time information of the refresh data packet nearest to the time information of the packet for which there is a retransmission request. Further, when the refresh method is like that of (2) of FIG. 4, the refresh data packet of the same reproduction screen location as the retransmission-requested packet is divided into a plurality of frames, and there exists a plurality of time information of a refresh data packet subsequent to the retransmission-requested packet, the furthest time is set as the time information of the refresh data packet subsequent to this packet (Refer to (2) of FIG. 4). The reading out of time information in Step 103 will be explained in detail further below.

Next, a determination is made as to whether or not a retransmission request will be issued using the refresh data packet time information, the packet type information of the packet for which there is a retransmission request, and the time information of the packet for which there is a retransmission request read out in accordance with Step 103 (Step 104). The details of the determination method in this Step 104 will also be explained further below. Now then, when it is determined in Step 104 that a retransmission request will be issued (The "Issue" direction in Step 104), a retransmission command is sent to the transmitting unit 14 (Step 105*a*). Further, when it is determined in Step 104 that a retransmission request will not be issued (The "Do Not Issue" direction in Step 104), retransmission is not carried out relative to a received retransmission request (Step 105*b*). Then, when the transmitting unit 14 receives a retransmission command, it reads out from the transmitted data buffer unit 15 the packet data for which there is a request, and retransmits the packet (Step 106).

(Acquisition of Refresh Data Packet Time Information)

Next, the acquisition of refresh data packet time information in Step 103 will be explained in detail. The information, which the retransmission determining unit 18 reads out from the packet information monitoring unit 17 here is the refresh data packet time information subsequent to the packet for which there is a retransmission request, the packet type information of the packet for which there is a retransmission request, and the time information of the packet for which there is a retransmission request, and in the following explanation of the first embodiment, the refresh data packet time information subsequent to the packet for which there is a retransmission request is recorded as RT information, the packet type information of the packet for which there is a retransmission request is recorded as SP information, and the time information of the packet for which there is a retransmission request is recorded as ST information.

Figure 5:
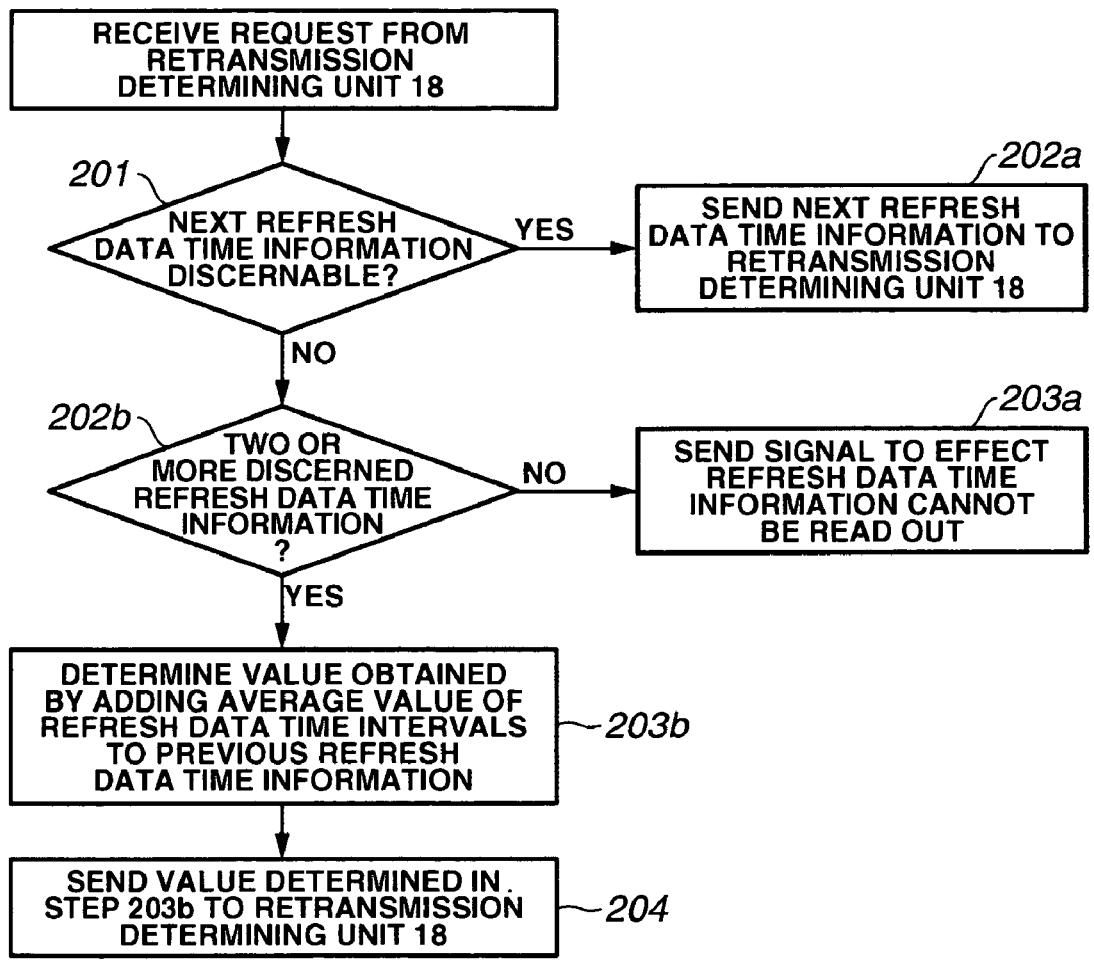
FIG. 5 is a flowchart showing the processing in a packet information monitoring unit 17 in the first embodiment of the present invention.

FIG. 5 is a flowchart showing the operation and response of the packet information monitoring unit 17 relative to a read-out request from the retransmission determining unit 18 for RT information, SP information, ST information, and other such information. First, when the packet information monitoring unit 17 receives the read-out request for RT information, SP information, ST information, and so forth from the retransmission determining unit 18, it makes a determination as to whether RT information is discernable (Step 201).

Next, in Step 201, when RT information subsequent to the retransmission-requested packet is discernable (YES direction of Step 201), this time is treated as the RT information, and sent to the retransmission determining unit 18 (Step 202a). Further, when the RT information subsequent to the retransmission-requested packet is not discernable (NO direction of Step 201), a determination is made as to whether or not there are two or more RT information discernable prior to the retransmission-requested packet (Step 202b).

Next, in Step 202b, when there is one or less RT information prior to the retransmission-requested packet (NO direction of Step 202b), a signal to the effect that it is impossible to respond with RT information is sent to the retransmission determining unit 18 (Step 203a). Further, when there are two or more RT information prior to the retransmission-requested packet (YES direction of Step 202b), the average value $R_{tav}$ of the time intervals up to the $t^{th}$ (the one immediately before the packet for which there is a retransmission request) refresh data packet discerned by the packet data information monitoring unit 17 is determined based on the following mathematical expression 1, and, in addition, the predictive value $R(t+1)P$ of the time of the refresh data packet subsequent to the retransmission-requested packet $(t+1^{st})$ is determined based on a mathematical expression 2, and this value $R(t+1)P$ is treated as the RT information (predictive time) (Step 203b).

$$R_{tav} = \frac{(R_2 - R_1) + (R_3 - R_2) + \ldots + (R_{t-1} - R_{t-2}) + (R_t - R_{t-1})}{t - 1}$$
$$= \frac{R_t - R_1}{t - 1}$$
[Mathematical Expression 1]

$$R_{(t+1)p} = R_t + R_{tav}$$
$$= \frac{tR_t - R_1}{t - 1}$$
[Mathematical Expression 2]

When the above mathematical expression 1 and mathematical expression 2 are used here, all t times of the refresh data packet prior to the packet for which there is a retransmission request are discerned by the packet information monitoring unit 17. Further, the time of the $t^{th}$ refresh data packet is treated as Rt. Further, the way of determining the predictive value of the time of the refresh data packet subsequent to the retransmission-requested packet is not limited to the above-mentioned mathematical expression 1 and mathematical expression 2, but rather, can be determined using another method, such as mathematical expression 3 and mathematical expression 4 below.

$$R'_{tav} = \frac{(R_{a+1} - R_a) + (R_{a+2} - R_{a+1}) + \ldots + (R_{t-1} - R_{t-2}) + (R_t - R_{t-1})}{t - a}$$
$$= \frac{R_t - R_a}{t - a}$$
[Mathematical Expression 3]

$$R'_{(t+1)p} = R_t + R'_{tav}$$
$$= \frac{(t - a + 1)R_t - R_a}{t - a}$$
[Mathematical Expression 4]

Here, in mathematical expression 3 and mathematical expression 4, the times of the successive (t−a+1) refresh data packets, from the $a^{th}$ to the time $(t^{th})$ of the refresh data packet immediately prior to the packet for which there is a retransmission request, are discerned. Furthermore, it takes an integer value of less than t.

In the above explanation, a method, which utilizes an average value, is given as an example, but there are also other methods, which utilize either a maximum value or a minimum value within a certain observation range. In addition, an encoder and control application also have this information. Or, if under observation, there is also a method for acquiring information from the encoder and control application.

Then, the RT information (predictive time) determined in Step 203b is sent to retransmission determining unit 18 (Step 204)

(Retransmission Determination)

Figure 6:
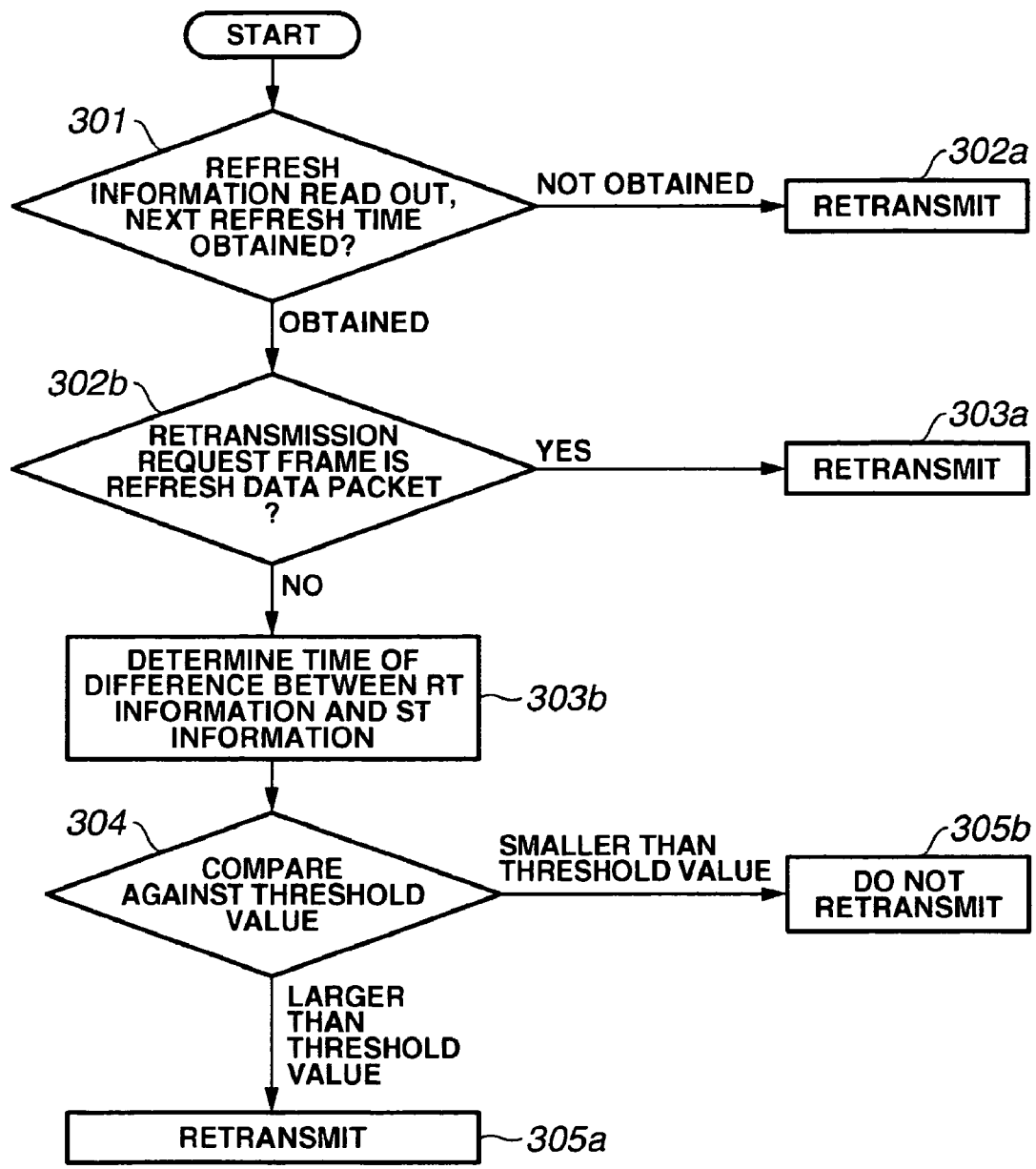
FIG. 6 is a flowchart showing retransmission determination processing in a retransmission determining unit 18 in the first embodiment of the present invention.

Next, the retransmission determination of the retransmission determining unit 18 in Step 104 will be explained in detail. FIG. 6 is a flowchart showing a retransmission determination in the retransmission determining unit 18. First of all, a determination is made as to whether RT information has been obtained (Step 301). Furthermore, "RT information unobtainable" points to a situation such as that of Step 203a of FIG. 5, for example, when RT information could not be read, or a situation in which the lack of a response from the packet information monitoring unit 17 within a predetermined time in Step 103 of FIG. 2 resulted in a timeout.

When RT information could not be obtained in Step 301 ("Not Obtained" direction of Step 301), a decision is made to retransmit the packet ("Retransmit" direction of Step 302a, and Step 104 of FIG. 2). Further, when RT information is obtained ("Obtained" direction of Step 301), SP information is referenced and a determination is made as to whether or not this retransmission-requested packet is a refresh data packet (Step 302b)

In Step 302b, when the retransmission-requested packet is a refresh data packet (Step 302b: YES), a decision is made to retransmit the packet ("Retransmit" direction of Step 303a, and Step 104 of FIG. 2). Further, when the retransmission-requested packet is other than a refresh data packet (Step 302b: NO), the time difference between RT information and ST information is sought (Step 303b). Then, the value of the difference between RT information and ST information determined in Step 303 is compared against a predetermined threshold value (Step 304). Furthermore, the predetermined threshold value is a value determined by the equipment, and when allowing retransmission as much as possible, the threshold value will be set low, and, by contrast, when prohibiting retransmission as much as possible, the threshold value will be set high. Further, the threshold value can also be set variably depending on the transmission channel situation. Further, when the predetermined threshold value is set to a fixed value, it is desirable to set the value to the minimum time or less of the time intervals of the respective refresh information. For example, when sending a data string in which a frame comprising refresh information will be displayed every second (when the time between A and B, B and C, and C and D is one second in (1) of FIG. 4), the predetermined threshold value can be set to 0.5 seconds (fixed value).

Further, for example, when sending a data string in which the intervals between frames comprising refresh information is not a fixed value (when the time intervals of frames comprising refresh information change dynamically from a time of one second between A and B, 1.2 seconds between B and C, and 0.8 seconds between C and D in (1) of FIG. 4), the predetermined threshold value can be set to a value of 60 percent of the interval between frames comprising current refresh information (the predetermined threshold value relative to the retransmission-requested packet of the diagonal line of (1) of FIG. 4 becomes 0.6 seconds). Thus, the predetermined threshold value can be set to a value, which is dependent on the time interval of frames comprising refresh information and the data to be transmitted.

Furthermore, the time intervals of refresh information in a refresh method such as that of (2) of FIG. 4 do not have to be in frame segments as shown in (2) of FIG. 4, but rather consideration can be given to intervals in segments which are refreshed inside a frame.

Next, when the time difference between RT information and ST information subsequent to retransmission being requested is not less than a predetermined threshold value in Step 304 ("Larger than Threshold Value" of Step 304), a decision is made to retransmit the packet ("Retransmit" direction of Step 305a, and Step 104 of FIG. 2). Further, when the time difference between RT information and ST information subsequent to retransmission being requested is less than a predetermined threshold value ("Smaller than Threshold Value" of Step 304), a decision is made not to retransmit the packet ("Do Not Retransmit" direction of Step 305b, and Step 104 of FIG. 2). Furthermore, when the time difference between RT information and ST information subsequent to retransmission being requested is not less than a predetermined threshold value in Step 304, processing proceeds to Step 305a, but when the time difference between RT information and ST information subsequent to retransmission being requested is equal to a predetermined threshold value, the present invention can be configured such that a packet is not retransmitted.

Further, when using the usage rate of the transmission channel band for ordinary packet communications, and the amount of retransmission waiting data held in a buffer or queue to determine sequencing based on the size of the difference between RT information and ST information even for packets for which a retransmission determination has been made, and the bandwidth capable of being used for retransmission is small, a method for retransmitting only high precedence packets is also applicable. In addition, the retransmission order of retransmission packets does not have to be carried out in sequential order, but rather can be changed such that packets having a high ranking are sent first.

Furthermore, in the first embodiment of the present invention, a case in which data is transmitted using the RTP/UDP/IP system was explained, but other systems can also by used within a scope that does not deviate from the purport of the present invention. Further, the refresh method was explained with regard to (1) of FIG. 4 and (2) of FIG. 4, but the present invention is not limited to these methods, and other refresh methods are also possible.

According to the first embodiment of the present invention, it is possible to carry out a retransmission decision efficiently because, when a retransmission request is received in the transmitter 1, a retransmission decision can be made in accordance with the timing of the subsequent refresh data packet.

Second Embodiment

Figure 7:
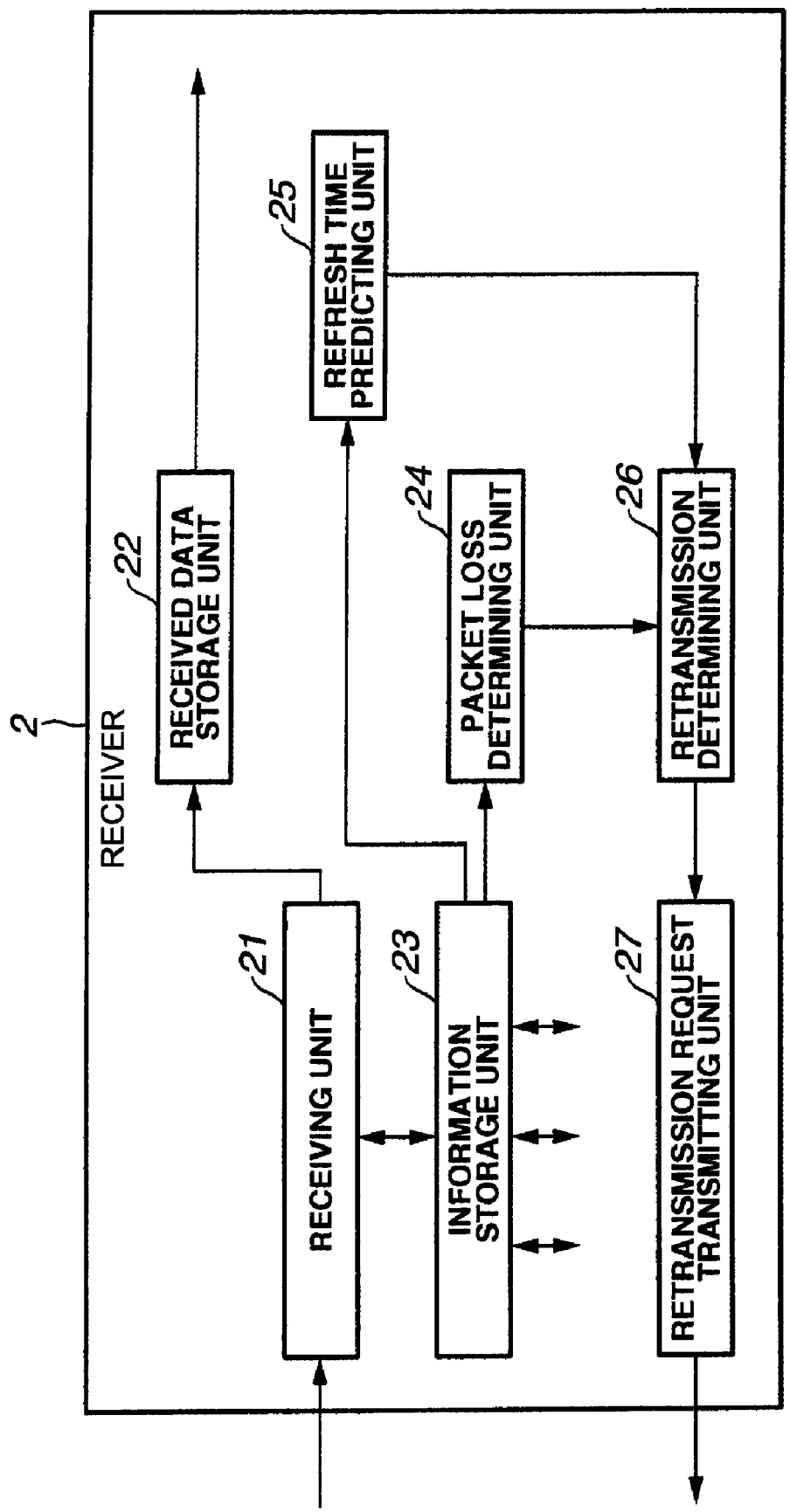
FIG. 7 is a block diagram of when the present invention is applied to a receiver.

An embodiment, which applies the present invention to a receiver, will be explained using the figures. FIG. 7 is a block diagram showing the structure of a receiver in the present invention. A receiver 2 of the present invention has a receiving unit 21, received data storage unit 22, information storage unit 23, packet loss determining unit 24, refresh time predicting unit 25, retransmission determining unit 26, and retransmission request transmitting unit 27. The respective parts of the receiver 2 have the following functions. Furthermore, the sequence number information, picture type information and time information disclosed below is the same data as the data explained in accordance with FIG. 3 in the first embodiment, and explanations thereof will be omitted. Further, when the respective data is data, which adopts the refresh method according to (2) of FIG. 4, in order to obtain picture type information, it is necessary to also acquire the slice header information and macro block information of the payload as explained in the first embodiment. Hereinafter, received data will be explained giving as an example a situation in which the refresh method is according to (1) of FIG. 4, but the present invention can also be applied to a refresh method according to (2) of FIG. 4 and other such refresh methods.

The receiver 22 has a function for receiving packets and so forth which have been sent from outside. Then, a received packet is sent to the received data storage unit 22. In addition, the received data storage unit 22 is decoded using a decoder not shown in the figure.

The information storage unit 23 has a function for storing packet information received by the receiver 21. Information stored in the information storage unit 23 comprises at the least sequence number information, picture type information and time information of a received packet. Then, this information is read out from the respective parts of the receiver 2. In addition, the information storage unit 23 also has a function for discerning the intervals of refresh data time from the packet sequence number information, picture type information and time information, and if the picture type information is an I-picture, for sending sequence number information and time information to the refresh time predicting unit 25.

Figure 8:
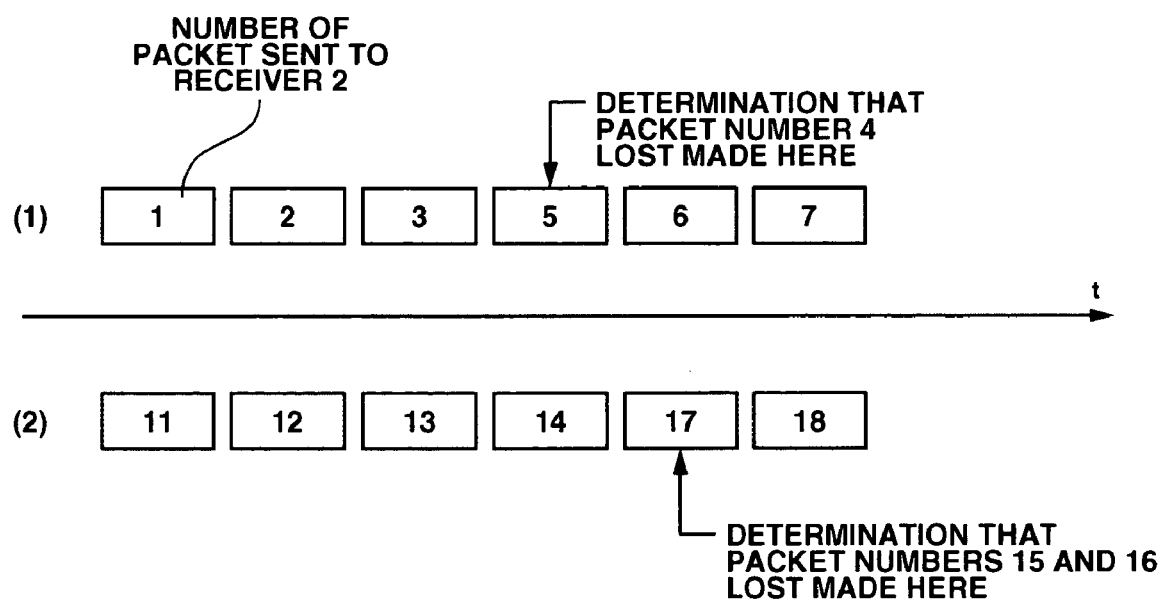
FIG. 8 is a diagram illustrating the detection of packet loss in a second embodiment of the present invention.

The packet loss determining unit 24 has a function for discerning received packet sequence number information from the information storage unit 23, and for determining whether a packet sent from the transmitting side is lost. FIG. 8 is a diagram illustrating the method for determining packet loss in the packet loss determining unit 24. The number assigned to a packet is that packets sequence number. The packet loss determining unit 24 discerns the sequence number of a received packet, determines if the packet is received in packet number order, and when a packet is not sequential, makes a determination that packet loss occurred. For example, the packet loss determining unit 24 receives packets in order from sequence number 1 as shown in (1) of FIG. 8, and ascertains whether or not number 2 and number 3 are received in sequence. Then, when it receives packet number 5 subsequent to packet number 3, it makes a determination that packet number 4 is missing. Similarly, in the situation depicted in (2) of FIG. 8, since packet number 17 is received subsequent to packet number 14, it makes a determination that packet number 15 and Packet number 16 are missing. Then, when it detects packet loss, the packet loss determining unit 24 sends the packet loss sequence number information to the retransmission determining unit 26.

The refresh time predicting unit 25 has a function for reading out I-picture sequence number information sent from the information storage unit 23, and the time information thereof, for using this I-picture sequence number information and its time information to discern the time interval of a refresh data packet, and for predicting the time information of the next refresh data packet. Furthermore, hereinafter, refresh data packet time information itself will be referred to as refresh time information, and predicted refresh data packet time information will be referred to as tentative time information. Furthermore, details regarding the method for predicting the time interval information of a refresh data packet, and the method for predicting subsequent tentative time information in accordance with the refresh time predicting unit 25 will be explained further below.

The retransmission determining unit 26 has a function for making a determination as to whether or not a retransmission request will be issued. The determination as to whether or not a retransmission request will be issued will be explained in detail further below.

The retransmission request transmitting unit 27 has a function for transmitting a retransmission request when it has been determined by the retransmission determining unit 26 that a retransmission request will be issued.

Figure 9:
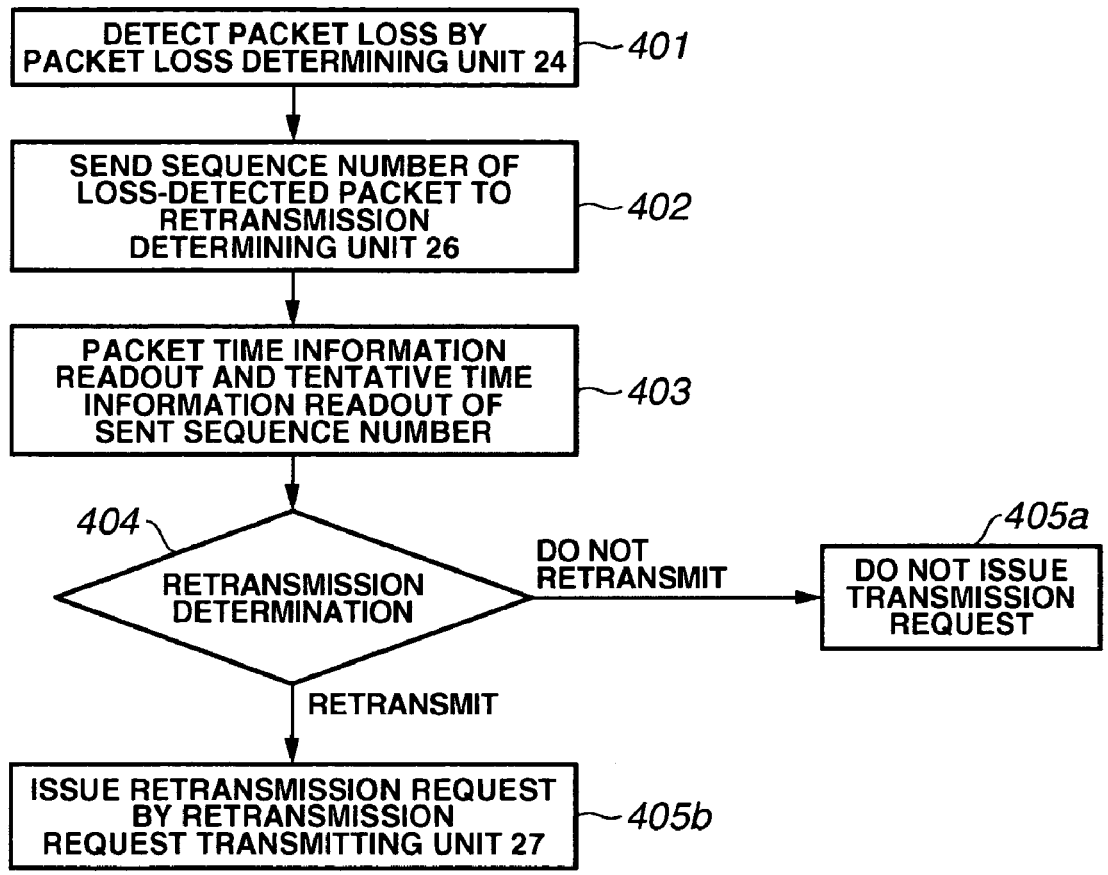
FIG. 9 is a flowchart showing a retransmission control method in the second embodiment of the present invention.

Next, a retransmission request control method in a receiver 2 of the present invention, in a case in which the receiving unit 21 has received packets, and packet loss has been determined in the packet loss determining unit 24, will be explained using a flowchart. FIG. 9 is a flowchart showing a retransmission request control method in a case when packet loss has been detected by the packet loss determining unit 24. First of all, when packet loss is detected by the packet loss determining unit 24 as described above (Step 401), the packet loss determining unit 24 discerns the sequence number of the lost packet, and sends this sequence number information to the retransmission determining unit 26 (Step 402).

Next, the packet loss determining unit 24 reads out from the information storage unit 23 the time information of a packet loss-detected packet, and reads out from the refresh time predicting unit 25 tentative time information subsequent to the loss-detected packet (Step 403). Furthermore, the time information of a packet loss-detected packet, for example, indicates the time information of the loss-detected packet, such as the packet of sequence number 5 shown in (1) of FIG. 8, and the packet of sequence number 17 shown in (2) of FIG. 8. Further, tentative time information subsequent to a loss-detected packet indicates the tentative time information following the time information of a packet loss-detected packet. Details concerning this tentative time information will be explained further below.

Next, the retransmission determining unit 26 carries out a retransmission determination using the tentative time information read out in Step 403, and lost-packet sequence number information (Step 404). Furthermore, a predetermined threshold value is defined the same as that disclosed in the first embodiment. Further, the details of the retransmission determination in Step 404 will be explained further below.

Now then, when a determination is made in Step 404 not to carry out retransmission ("Do Not Retransmit" direction of Step 404), the packet is treated as a lost packet without issuing a retransmission request, and a retransmission request is not issued (Step 405a). Further, when a determination is made in Step 404 to carry out retransmission ("Retransmit" direction of Step 404), the retransmission request transmitting unit 27 sends a retransmission request to the transmitter, which transmitted the packet (Step 405b).

(Predicting Tentative Time Information)

Figure 10:
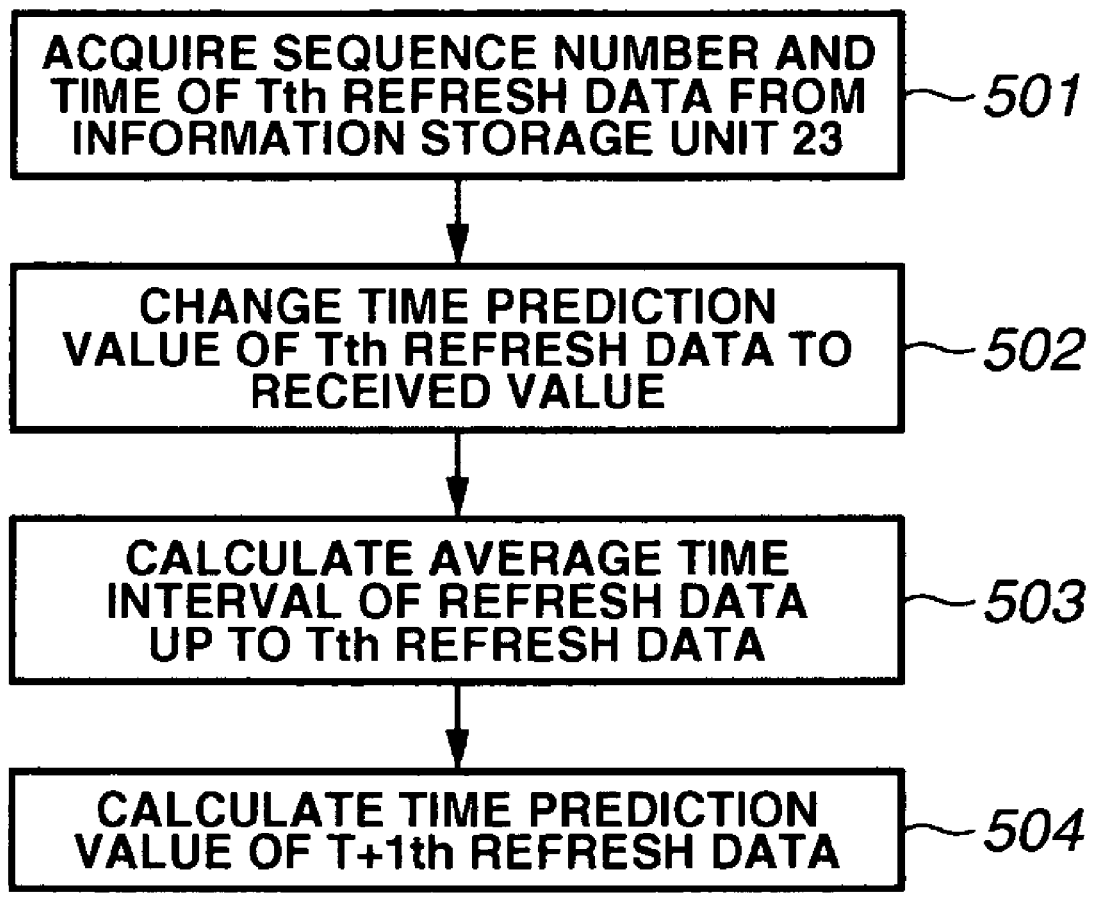
FIG. 10 is a flowchart showing a time prediction method of a refresh data packet in the second embodiment of the present invention.

Next, a method for finding tentative time information using the refresh time predicting unit 25 will be explained in detail. FIG. 10 is a flowchart showing a method for predicting a $t+1^{th}$ refresh time information ($t+1^{th}$ tentative time information) in a case when the refresh time predicting unit 25 acquired from the information storage unit 23 the sequence number information of a $t^{th}$ refresh data packet, and the time information thereof. Furthermore, the t of the "$t^{th}$ refresh data packet" takes an integer value of 1 or more, and is a value, which counts only a refresh data packet when received data is lined up in the order displayed. That is, a method for predicting $t+1^{th}$ refresh time information, when up to a $t^{th}$ refresh data packet is received inside a reception-scheduled data string in the receiver 2, is described here.

First of all, when the refresh time predicting unit 25 acquires from the information storage unit 23 the sequence number information of the $t^{th}$ refresh data packet, and the time information thereof (Step 501), when $t^{th}$ tentative time information exists, this $t^{th}$ tentative time information is converted to the refresh time information received in Step 501 (Step 502).

Next, the average value Rtav of the time intervals of the $1^{st}$ through the $t^{th}$ refresh time information is determined using the above-mentioned mathematical expression 1 (Step 503). Furthermore, when refresh time information does not exist, tentative time information is used. Thereafter, the $t+1^{th}$ tentative time information R(t+1)p is determined in accordance with the above-mentioned mathematical expression 2, using the average value Rtav of the time intervals of refresh time information, and the $t^{th}$ refresh time information (tentative time information when $t^{th}$ refresh time information does not exist) (Step 504).

Furthermore, in the above Steps 503 and 504, $t+1^{th}$ tentative time information R(t+1)p is determined using mathematical expression 1 or mathematical expression 2, but as explained in the first embodiment, the average value R'tav of the time intervals of refresh time information and tentative time information R'(t+1)p can also be determined using mathematical expression 3 or mathematical expression 4. Further, just like in the first embodiment, a method for using not only an average value, but also either a maximum value or a minimum value within a certain observation range is also applicable. In addition, if a decoder or control application has/observes this information, there is also a method for acquiring information from this decoder or control application.

(Retransmission Determination)

Figure 11:
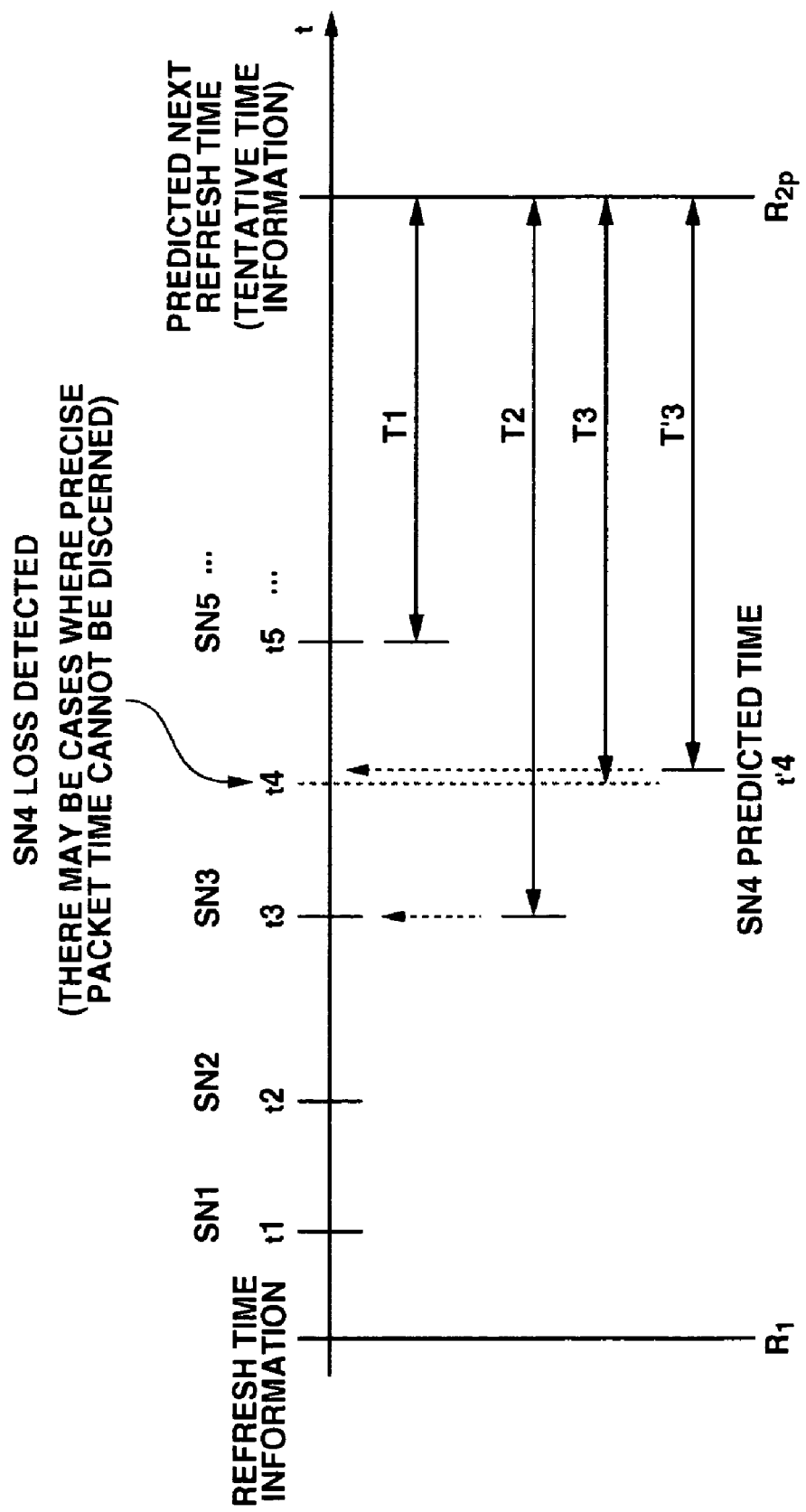
FIG. 11 is a diagram illustrating a retransmission determination method in the second embodiment of the present invention.
Figure 12:
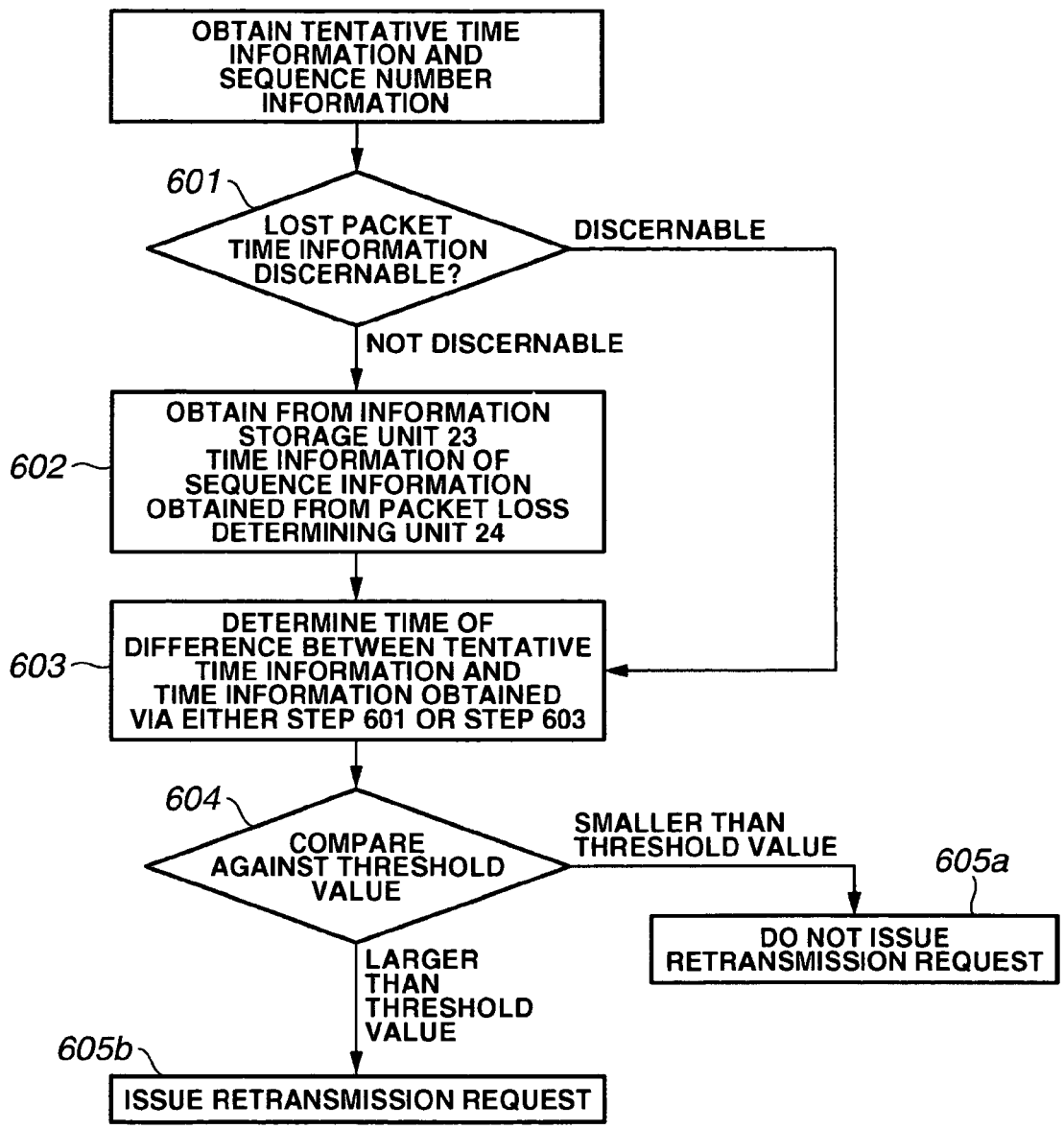
FIG. 12 is a flowchart showing a retransmission determination method in the second embodiment of the present invention.

Next, a retransmission determination in the above-mentioned Step 404 will be explained in detail. FIG. 11 is a diagram illustrating a retransmission determination in Step 404, and FIG. 12 is a flowchart showing the detailed operation of the retransmission determination in Step 404. First of all, when the retransmission determining unit 26 obtains sequence number information from the packet loss determining unit 24, and tentative time information (for example, R2p of FIG. 11) from the refresh time predicting unit 25 (corresponding to Step 403 of FIG. 9), it then makes a determination as to whether or not it is possible to discern the time information of the lost packet (t4 of FIG. 11) (Step 601). When lost packet time information (t4) is discernable in this Step 601, it is indicative of the following situation. A single slice (indicates a single image), which is shown in (1) of FIG. 4 and so forth, can be divided and packetized in a plurality of packets, and when divided and packetized in a plurality of packets, even if one of these packets should get lost, a part of the same slice as that of the lost packet is packetized by another packet, and since the lost packet time information is the same slice as that of this packet, it has the same time information. This is indicative that in Step 601 lost packet time information is derived from the above-mentioned state.

Now then, when the retransmission determining unit 26 is able to discern the lost packet time information in Step 601, processing proceeds to Step 603 ("Discernable" direction of Step 601). Further, when the retransmission determining unit 26 is not able to discern the lost packet time information in Step 601, ("Not Discernable" direction of Step 601), it obtains from the information storage unit 23 the time information of the packet having the packet loss-detected sequence number information sent from the packet loss determining unit 24 (packet time information t5 of sequence number SN5 of FIG. 11) (Step 602). Furthermore, the information, which the retransmission determining unit 26 obtains in Step 602, is not limited to this, and it can also obtain time information of a packet having the sequence number immediately prior to where the loss occurred (t3 of FIG. 11), or time information of a packet having the sequence number immediately following where the loss occurred (t5 of FIG. 11), and it can also obtain a predicted time t'4 of the time information t4 of the lost packet (determined by the average value of t3 and t5).

Next, the retransmission determining unit 26 determines the values (T1, T2, T3, T'3, and so forth of FIG. 11) of the differences of the tentative time information (for example, R2p of FIG. 11) obtained from the refresh time predicting unit 25 in Step 403, and the time information obtained either in Step 601 or Step 602 (t3, t4, t'4, t5 and so forth of FIG. 11) (Step 603). Then, it compares the values of the differences between the tentative time information determined in Step 603 and the time information obtained either in Step 601 or Step 602 (T1, T2, T3, T'3 and so forth of FIG. 11) against a predetermined threshold value (Step 604). The predetermined threshold value used in this Step 604 is defined the same as the threshold value utilized in the first embodiment, and an explanation thereof will be omitted.

Then, in Step 604, when the values of the differences between the tentative time information determined in Step 603 and the time information obtained either in Step 601 or Step 602 (T1, T2, T3, T'3 and so forth of FIG. 11) are less than the predetermined threshold value ("Smaller Than Threshold Value" direction of Step 604), the retransmission determining unit 26 makes a determination not to issue a retransmission request (Step 605a), and when the values of the differences between the tentative time information determined in Step 603 and the time information obtained either in Step 601 or Step 602 (T1, T2, T3, T'3 and so forth of FIG. 11) are not less than the predetermined threshold value ("Larger Than Threshold Value" direction of Step 604), it makes a determination to issue a retransmission request (Step 605b).

According to the second embodiment of the present invention, a retransmission request decision can be made efficiently because, when packet loss is detected in the receiver 2, it is possible to make a retransmission request decision in accordance with the time until the next refresh data packet.

Third Embodiment

Figure 13:
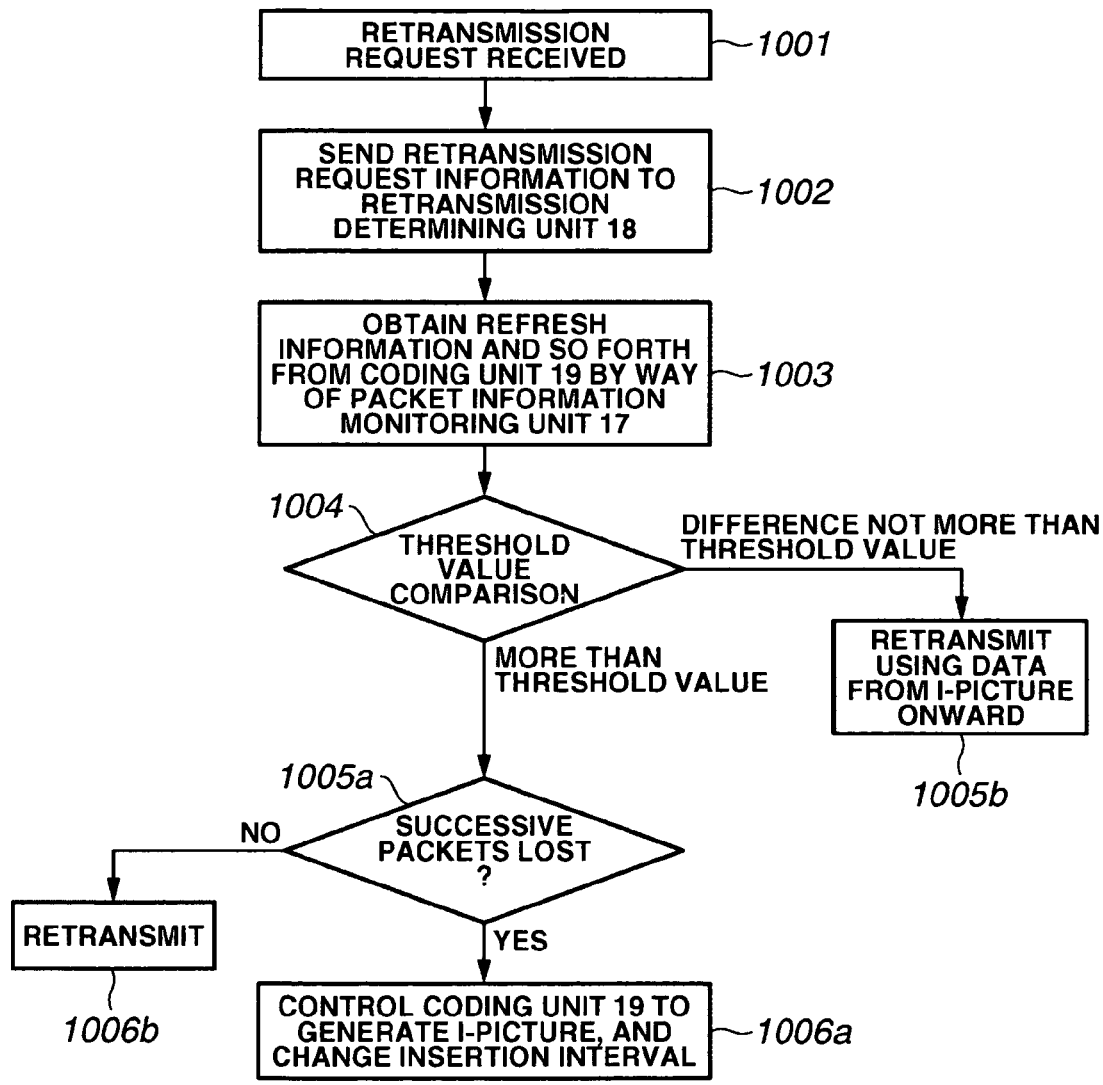
FIG. 13 is a flowchart showing retransmission determination processing in a transmitter 1 in a third embodiment of the present invention.

A third embodiment, which applies the present invention to a transmitter, will be explained. Furthermore, since the constitution of the transmitter in this third embodiment is the same as that of the first embodiment, an explanation thereof will be omitted (FIG. 1). Now then, a retransmission control method in this third embodiment will be explained using the flowchart of FIG. 13. FIG. 13 is a flowchart showing a retransmission control method in accordance with a transmitter 1. First of all, when packet data sent by the transmitting unit 14 incurs packet loss for some reason, and a retransmission request is sent from the receiving side, and this retransmission request is received in the receiving unit 16 (Step 1001), the receiving unit 16 sends the retransmission request information, which has been sent, to the retransmission determining unit 18 (Step 1002). Furthermore, the same as in the above-mentioned first embodiment, it is common for the retransmission request information in Step 1002 to utilize sequence number information disclosed in the RTP header of the packet sent by the transmitting unit 14. Further, as the retransmission request method, a method, which directly specifies the sequence number of the packet to be retransmitted (NACK system), and a method, which indirectly specifies the packet, which could not be received, by communicating only the number of the received packet (ACK system), can be considered. Any kind of retransmission request method can be used in the present invention, and, for example, a system, which uses the time stamp information included in the RTP packet, communicates the packet time information from the receiving side to the transmitting side, and requests the retransmission of a packet corresponding to this time, or a system, which communicates the time of a packet that the receiving side is currently in the process of decoding or displaying, or the network transmission delay information, and determines the packet to be retransmitted to the transmitting side, can also be considered. Thus, retransmission request information is not limited to the above-mentioned sequence number alone, but rather can be any information so long as it is information, which reveals which packet a retransmission is being requested for, or the time, at which this packet is used (at which the image of this packet is displayed).

Next, when the retransmission determining unit 18 receives retransmission request information, it reads out, from the decoder 19 by way of the packet information monitoring unit 17, the time information of the refresh data packet subsequent to the packet for which there is a retransmission request (Step 1003).

Next, the retransmission determining unit 18 makes a determination as to whether or not the difference of the time information of the refresh data packet read out by Step 1003 and the time information of the packet for which there is a retransmission request exceeds a predetermined threshold value (Step 1004). Then, when it determines that the difference of the time information of the refresh data packet and the time information of the packet for which there is a retransmission request in Step 1004 is not more than the predetermined threshold value ("Difference Not More Than Threshold Value" direction of Step 1004), it issue a command to the transmitting unit 14 to retransmit the data to be retransmitted using the data of the refresh data packet from the I-picture onward (Step 1005b).

Further, when the retransmission determining unit 18 determines that the difference of the time information of the refresh data packet and the time information of the packet for which there is a retransmission request in Step 1004 is more than (or exceeds) the predetermined threshold value ("More Than Threshold Value" direction of Step 1004), the retransmission determining unit 18 makes a determination as to whether or not the preceding and succeeding packets are missing (whether or not a retransmission request has arrived for the preceding and succeeding packets) (Step 1005a). Then, when the retransmission determining unit 18 determines in Step 1005a that the preceding and succeeding packets are not missing ("NO" direction of Step 1005*a*), it performs a retransmission relative to the pertinent retransmission request (Step 1006*b*). Further, when it determines in Step 1005*a* that the preceding and succeeding packets are missing ("YES" direction of Step 1005*a*), the retransmission determining unit 18 performs control so as to issue a request to the decoder 19 by way of the packet information monitoring unit 17 to generate an I-picture for the packet for which there is a retransmission request, and to retransmit it from there once again (Step 1006*a*).

Furthermore, since the time information of the refresh data packet used in this embodiment is determined by the calculation method in the first embodiment, an explanation thereof will be omitted.

Using the retransmission control method of this embodiment enables appropriate retransmission control while making it possible to avoid bandwidth pressure, either when a retransmission request is received at a timing such that an I-picture is transmitted immediately thereafter, or when a retransmission request is received for a packet immediately following the transmission of an I-picture.

Fourth Embodiment

Figure 14:
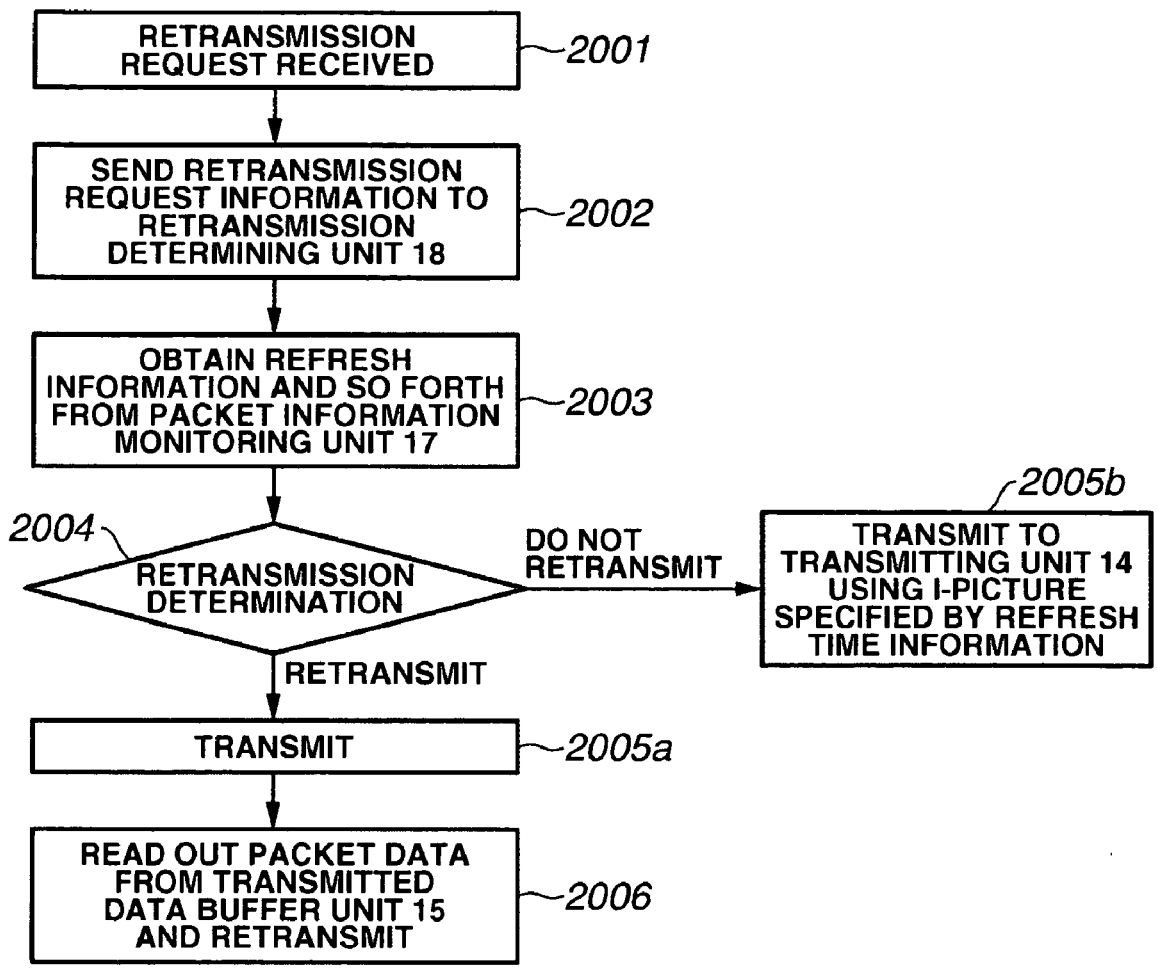
FIG. 14 is a flowchart showing retransmission determination processing in a transmitter 1 in a fourth embodiment of the present invention.

A fourth embodiment, which applies the present invention to a transmitter, will be explained. Furthermore, since the constitution of the transmitter in this fourth embodiment is the same as that of the first embodiment, an explanation thereof will be omitted (FIG. 1). Further, a retransmission control method in a transmitter 1 of the present invention, when the receiving unit 16 has received a retransmission request, will be explained using a flowchart. FIG. 14 is a flowchart showing a retransmission control method in accordance with a transmitter 1. First of all, when packet data sent by the transmitting unit 14 incurs packet loss for some reason, and a retransmission request is sent from the receiving side, and this retransmission request is received in the receiving unit 16 (Step 2001), the receiving unit 16 sends the retransmission request information, which has been sent, to the retransmission determining unit 18 (Step 2002).

Next, when the retransmission determining unit 18 receives the retransmission request information, it reads out, from the packet information monitoring unit 17, the time information of the refresh data packet subsequent to the packet for which there is a retransmission request, and the time information of the packet for which there is a retransmission request (Step 2003).

Next, the retransmission determining unit 18 makes a determination as to whether or not to issue a retransmission request using the time information of the refresh data packet read out by Step 2003 and the time information of the packet for which there is a retransmission request (Step 2004). Since the details of the determination method in this Step 2004 are the same as that of the first embodiment, an explanation thereof will be omitted. Then, when it determines in Step 2004 that a retransmission request will be issued ("Issue" direction of Step 2004), the retransmission determining unit 18 sends a retransmission command to the transmitting unit 14 (Step 2005*a*). Further, when it is determined by the retransmission determining unit 18 in Step 2004 that a retransmission request will not be issued ("Do Not Issue" direction of Step 2004), the retransmission determining unit 18 issues a command to the transmitting unit 14 so as to perform transmission control using data from the I-picture onward, which is specified in the subsequent refresh time information, without performing a retransmission relative to the received retransmission request (Step 2005*b*). In other words, the retransmission determining unit 18 performs control so as to quickly transmit from a packet specified by the refresh time information onward, without transmitting the packet data up to the subsequent refresh time.

Then, when the transmitting unit 14 receives the retransmission command, it reads out from the transmitted data buffer unit 15 the packet data for which there is a request, and retransmits the packet (Step 2006).

Furthermore, since the time information of the refresh data packet used in this embodiment is determined by the calculation method in the first embodiment, an explanation thereof will be omitted.

Using the retransmission control method of this embodiment enables appropriate retransmission control while making it possible to avoid bandwidth pressure, when a retransmission request is received at a timing such that an I-picture is transmitted immediately thereafter.

What is claimed is:

1. A transmitter, comprising:
   a transmitting unit configured to transmit a packet of packetized image data;
   a receiving unit configured to receive a retransmission request for retransmission of the packet transmitted by the transmitting unit;
   a packet managing unit configured to manage reproduction time information of the packet transmitted by the transmitting unit; and
   a packet retransmission controller configured to, (i) if the retransmission request is received by the receiving unit, read out from the packet managing unit a first reproduction time, at which image data of the packet requested for retransmission is reproduced, and a second reproduction time, which is later than the first reproduction time and is a time at which a frame containing intra prediction data nearest to the first reproduction time is reproduced, and (ii) if a difference between the first reproduction time and the second reproduction time is not less than a predetermined threshold value, send to the transmitting unit a command for retransmitting the packet requested for retransmission;
   wherein the packet retransmission controller is configured not to send to the transmitting unit the command for retransmitting the packet requested for retransmission, if the difference between the first reproduction time and the second reproduction time is less than the predetermined threshold value.

2. The transmitter according to claim 1, wherein the packet managing unit is configured to predict the second reproduction time based on at least two reproduction times of frames containing the intra prediction data, wherein the at least two reproduction times are earlier than the first reproduction time.

3. The transmitter according to claim 2, wherein the packet managing unit predicts the second reproduction time by determining an average time interval between sequential reproduction times of the at least two frames containing the intra prediction data, and by adding the average time interval to a reproduction time, which is earlier than the first reproduction time, and which is the closest reproduction time to the first reproduction time of a frame containing the intra prediction data.

4. A transmitter, comprising:
   a transmitting unit configured to transmit a packet of packetized image data;
   a receiving unit configured to receive a retransmission request for retransmission of the packet transmitted by the transmitting unit;

a packet managing unit configured to manage reproduction time information of the packet transmitted by the transmitting unit; and a packet retransmission controller configured to, (i) if the retransmission request is received by the receiving unit, read out from the packet managing unit a first reproduction time, at which image data of the packet requested for retransmission is reproduced, and a second reproduction time, which is later than the first reproduction time and is a time at which a frame containing intra prediction data nearest to the first reproduction time is reproduced, and (ii) if a difference between the first reproduction time and the second reproduction time is not less than a predetermined threshold value, and if sequential disappearance of packets either preceding or succeeding the packet requested for retransmission is detected, perform control so as to retransmit the packet requested for retransmission using the frame containing the intra prediction data;

wherein the packet retransmission controller is configured not to perform the control so as to retransmit the packet requested for retransmission using the frame containing the intra prediction data, if the difference between the first reproduction time and the second reproduction time is less than the predetermine threshold value.

5. A receiver, comprising:

a receiving unit configured to receive a packet of coded and packetized image data;

an information storage unit configured to store information of the packet received by the receiving unit;

a packet loss determining unit configured to determine a packet loss based on whether or not packets are received in order by the receiving unit;

a packet time-information predicting unit configured to predict a second reproduction time, which is later than a first reproduction time, wherein the first reproduction time is a time at which image data is reproduced after a packet that is determined to be lost by the packet loss determining unit, and the second reproduction time is later than the first reproduction time, and is a time at which a frame containing intra prediction data nearest to the first reproduction time is reproduced, wherein the packet time-information predicting unit predicts the second reproduction time based on at least two reproduction times of frames containing the intra prediction data, and wherein the at least two reproduction times are earlier than the first reproduction time; and a retransmission determining unit configured to determine to issue a retransmission request for retransmission of the lost packet if the packet loss is determined by the packet loss determining unit, and if a difference between the second reproduction time predicted by the packet time-information predicting unit and the first reproduction time is not less than a predetermined threshold value;

wherein the retransmission determining unit is configured to determine not to issue the retransmission request if the difference between the second reproduction time and the first reproduction time is less than the predetermined threshold value.

6. The receiver according to claim 5, wherein the packet time-information predicting unit predicts the second reproduction time by determining an average time interval between sequential reproduction times of the at least two frames containing the intra prediction data, and by adding the average time interval to a reproduction time, which is earlier than the first reproduction time, and which is the closest reproduction time to the first reproduction time of a frame containing the intra prediction data.

7. A receiver, comprising:

a receiving unit configured to receive a packet of coded and packetized image data;

an information storage unit configured to store information of the packet received by the receiving unit;

a packet loss determining unit configured to determine packet loss based on whether or not packets are received in order by the receiving unit;

a packet time-information predicting unit configured to predict a second reproduction time, which is later than a first reproduction time, wherein the first reproduction time is a time at which image data of a lost packet, which is determined to be lost by the packet loss determining unit, would have been reproduced, and the second reproduction time is later than the first reproduction time, and is a time at which a frame containing intra prediction data nearest to the first reproduction time is reproduced, wherein the packet time-information predicting unit predicts the second reproduction time based on at least two reproduction times of frames containing the intra prediction data, and wherein the at least two reproduction times are earlier than the first reproduction time; and a retransmission determining unit configured to determine to issue a retransmission request for retransmission of the lost packet if the packet loss is determined by the packet loss determining unit, and if a difference between the second reproduction time predicted by the packet time-information predicting unit and the first reproduction time is not less than a predetermined threshold value;

wherein the retransmission determining unit is configured to determine not to issue the retransmission request if the difference between the second reproduction time and the first reproduction time is less than the predetermined threshold value.

8. The receiver according to claim 7, wherein the packet time-information predicting unit predicts the second reproduction time by determining an average time interval between sequential reproduction times of the at least two frames containing the intra prediction data, and by adding the average time interval to a reproduction time, which is earlier than the first reproduction time, and which is the closest reproduction time to the first reproduction time of a frame containing the intra prediction data.

9. A receiver, comprising:

a receiving unit configured to receive a packet of coded and packetized image data;

an information storage unit configured to store information of the packet received by the receiving unit;

a packet loss determining unit configured to determine packet loss based on whether or not packets are received in order by the receiving unit;

a packet time-information predicting unit configured to predict a second reproduction time, which is later than a first reproduction time, wherein the first reproduction time is a predicted time at which image data of a lost packet, which is determined to be lost by the packet loss determining unit, would have been reproduced, and the second reproduction time is later than the first reproduction time, and is a time at which a frame containing intra prediction data nearest to the first reproduction time is reproduced, wherein the first reproduction time is predicted based on reproduction times of image data reproduced before and after the lost packet, wherein the packet time-information predicting unit predicts the second reproduction time based on at least two reproduction times of frames containing the intra prediction data, and wherein the at least two reproduction times are earlier than the first reproduction time; and a retransmission determining unit configured to determine to issue a retransmission request for retransmission of the lost packet if the packet loss is determined by the packet loss determining unit, and if a difference between the second reproduction time predicted by the packet time-information predicting unit and the first reproduction time is not less than a predetermined threshold value;

wherein the retransmission determining unit is configured to determine not to issue the retransmission request if the difference between the second reproduction time and the first reproduction time is less than the predetermined threshold value.

10. The receiver according to claim 9, wherein the packet time-information predicting unit predicts the first reproduction time based on an average of the reproduction time of the image data which is reproduced after to the lost packet, and the reproduction time of image data which is reproduced before the lost packet.

11. The receiver according to claim 9, wherein the packet time-information predicting unit predicts the second reproduction time by determining an average time interval between sequential reproduction times of the at least two frames containing the intra prediction data, and by adding the average time interval to a reproduction time, which is earlier than the first reproduction time, and which is the closest reproduction time to the first reproduction time of a frame containing the intra prediction data.

12. A receiver, comprising:

a receiving unit configured to receive a packet of coded and packetized image data;

an information storage unit configured to store information of the packet received by the receiving unit;

a packet loss determining unit configured to determine packet loss based on whether or not packets are received in order by the receiving unit;

a packet time-information predicting unit configured to predict a second reproduction time, which is later than a first reproduction time, wherein the first reproduction time is a time at which image data is reproduced before a packet that is determined to be lost by the packet loss determining unit, and the second reproduction time is later than the first reproduction time, and is a time at which a frame containing intra prediction data nearest to the first reproduction time is reproduced, wherein the packet time-information predicting unit predicts the second reproduction time based on at least two reproduction times of frames containing the intra prediction data, and wherein the at least two reproduction times are earlier than the first reproduction time; and a retransmission determining unit configured to determine to issue a retransmission request for retransmission of the lost packet if the packet loss is determined by the packet loss determining unit, and if a difference between the second reproduction time predicted by the packet time-information predicting unit and the first reproduction time is not less than a predetermined threshold value;

wherein the retransmission determining unit is configured to determine not to issue the retransmission request if the difference between the second reproduction time and the first reproduction time is less than the predetermined threshold value.

13. The receiver according to claim 12, wherein the packet time-information predicting unit predicts the second reproduction time by determining an average time interval between sequential reproduction times of the at least two frames containing the intra prediction data, and by adding the average time interval to a reproduction time, which is earlier than the first reproduction time, and which is the closest reproduction time to the first reproduction time of a frame containing the intra prediction data.

* * * * *